United States Patent Office 3,152,136
Patented Oct. 6, 1964

3,152,136
DINITROAROYL-N-PYRIDYL AMIDES
Guy H. Harris, Concord, Patricia S. Ichioka, Berkeley, and Bryant C. Fischback, Walnut Creek, Calif., assignors to The Dow Chemical Company, Midland, Mich., a corporation of Delaware
No Drawing. Filed Oct. 30, 1958, Ser. No. 770,579
3 Claims. (Cl. 260—295)

This invention is concerned with dinitroaroylamide compounds corresponding to the formula

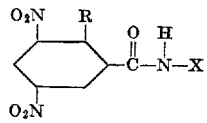

In this and succeeding formulae, R represents hydrogen, methyl, ethyl or methoxy, and X represents a non-acid, monoheterocyclic organic radical. The expression, non-acid monoheterocyclic armoatic radical, is employed in the present specification and claims to refer to the fully unsaturated monocyclic radicals containing from 5 to 6 carbon atoms in the ring including no more than three hetero-atoms from the group consisting of nitrogen, oxygen and sulfur. These new compounds are crystalline solids which are somewhat soluble in many organic solvents and water. The compounds are useful as parasiticides and are adapted to be employed in dust and liquid compositions for the control of a number of helminth, insect, fungal and protozoan organisms such as *Eimeria tenella* and *Eimeria necatrix*.

The new compounds may be prepared by mixing or blending a dinitroaroyl halide corresponding to the formula

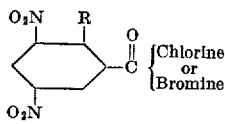

with an amine compound corresponding to the formula X—NH₂. Representative amine compounds include aminopyridine, aminopicoline, aminolutidine, 2-aminothiazole, aminofuran, aminothiophene, aminopyrrole, aminodiazole, 2-aminooxazole, 3-amino-1,2,4-triazole, 2-aminopyrazine, 3-aminopyridazine and 4-aminopyrimidine. The contacting of the reactants is carried out in an organic reaction medium such as water or diethyl ether. The reaction is somewhat exothermic and takes place smoothly at the temperature range of from 10° to 80° C. with the production of the desired product and hydrogen halide of reaction. This hydrogen halide appears in the reaction mixture as a hydrogen halide salt of the amine reagent. The temperature may be controlled by regulating the rate of contacting the reactants and by external cooling. Good results are obtained when employing one molecular proportion of acid halide with at least one molecular proportion of the amine reagent.

In carrying out the reaction, the reactants are contacted portionwise one with the other in the reaction solvent and the resulting mixture maintained for a short period of time at the contacting temperature range to insure completion of the reaction. During the course of the reaction, a solid material usually precipitates in the reaction mixture. Upon completion of the reaction, the reaction mixture may be cooled to precipitate a solid material or to precipitate further solid material. The solid material is then separated by filtration and washed with a dilute aqueous solution of an alkali metal salt such as sodium bicarbonate to separate water soluble impurities such as amine hydrohalide and obtain the desired product as a crystalline residue. The product may be further purified by conventional methods such as washing with water and recrystallization from organic solvents.

The following examples illustrate the invention but are not to be construed as limiting the same.

EXAMPLE 1

*N-(2-Pyridyl) 3,5-Dinitro-o-Toluamide*

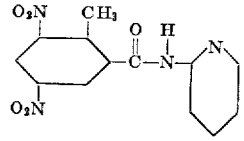

3,5-dinitro-o-toluyl chloride (24.5 grams; 0.1 mole) was added portionwise with stirring to 9.9 grams (0.105 mole) of 2-aminopyridine dissolved in 300 milliliters of water. The addition was carried out over a period of 15 minutes and at a temperature of from 20° to 30° C. Stirring was thereafter continued for one hour at room temperature to complete the reaction. During the course of the reaction, a solid material precipitated in the reaction mixture. Upon completion of the reaction, the solid was separated by filtration and successively recrystallized from ethanol and aqueous methanol. The recrystallized material was thereafter suspended for one hour in aqueous 10 percent sodium bicarbonate and thereafter washed with water and the washed product recrystallized from ethanol. As a result of these operations, there was obtained an N-(2-pyridyl) 3,5-dinitro-o-toluamide product as a crystalline solid melting at 183°–184° C., and having a carbon content and hydrogen content of 51.3 percent and 3.35 percent, respectively as compared to theoretical contents of 51.7 percent and 3.34 percent.

EXAMPLE 2

*N-(2-Thiazolyl) 3,5-Dinitro-o-Toluamide*

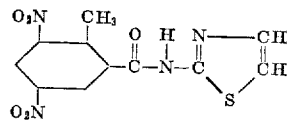

A solution containing 24 grams (0.24 mole) of 2-aminothiazole in 200 milliliters of ether was added slowly portionwise with stirring to 24.5 grams (0.1 mole) of 3,5-dinitro-o-toluyl chloride dissolved in 100 milliliters of toluene. The addition was carried out over a period of 10 minutes and at a temperature of from 55 to 60° C. During the addition, a solid material precipitated in the reaction mixture. Upon completion of the addition, the solid was separated by filtration, recrystallized from glacial acetic acid, and the recrystallized material successively washed with dilute aqueous sodium bicarbonate and water. As a result of these operations, there was obtained an N-(2-thiozolyl) 3,5-dinitro-o-toluamide product as a crystalline solid melting at 271.5–272.5° C., and having a car-

EXAMPLE 3

*N-(2-Gammapicolyl) 3,5-Dinitro-o-Toluamide*

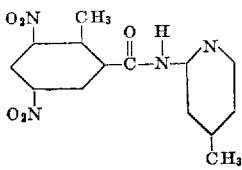

A solution containing 24.5 grams (0.1 mole) of 3,5-dinitro-o-toluyl chloride in 700 milliliters of diethyl ether was added slowly portionwise to 10.8 grams (0.1 mole) of 2-amino-4-picoline dissolved in 500 milliliters of diethyl ether. The addition was carried out over a period of 60 minutes and at a temperature of from 20° to 25° C. During the addition, a solid separated in the reaction mixture. Upon completion of the addition, the solid was separated by filtration, and the separated product washed with aqueous 10 percent sodium bicarbonate and thereafter recrystallized from ethanol. As a result of these operations, there was obtained an N-(2-gammapicolyl) 3,5-dinitro-o-toluamide product as a crystalline solid melting at 207.5–208.5° C. and having a carbon content of 53.16 percent and a nitrogen content of 17.98 percent as compared with theoretical contents of 53.1 percent and 17.7 percent, respectively.

EXAMPLE 4

*N-[3-(1,2,4-Triazyl)]3,5-Dinitrobenzamide*

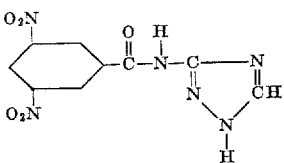

3-amino-1,2,4-triazole (8.4 grams; 0.1 mole) was dissolved in 75 milliliters of pyridine at about 65° C. and 11.5 grams (0.05 mole) of 3,5-dinitrobenzoyl chloride added portionwise thereto. The addition was carried out with stirring and at a temperature of 65° C. Upon completion of the reaction, the reaction mixture was cooled. During the cooling, a material precipitated in the mixture as a solid. The solid was separated by filtration, and successively washed with dilute aqueous sodium bicarbonate and water. As a result of these operations there was obtained an N-[3-(1,2,4-triazyl)]3,5-dinitrobenzamide product as a crystalline solid having a carbon, hydrogen and nitrogen contents of 39.58, 2.36 and 29.19 percent respectively, as compared to theoretical contents of 38.86, 2.17 and 30.3. N-[3-(1,2,4-triazyl)]3,5-dinitrobenzamide has a molecular weight of 277.

EXAMPLE 5

*N-[4-(2,6-Dimethylpyrimidyl)]3,5-Dinitrobenzamide*

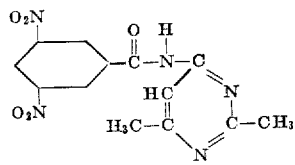

4-amino-2,6-dimethylpyrimidine (12.3 grams, 0.1 mole) was dispersed in 75 milliliters of pyridine and 23 grams (0.1 mole) of 3,5-dinitrobenzoyl chloride added portionwise thereto with stirring. During the additing, the temperature of the reaction mixture became quite warm to touch. Following the reaction, the reaction mixture was diluted with a mixture of dilute aqueous hydrochloric acid and ice and thereafter filtered. The filtrate was then adjusted to a pH of from 5 to 6 by the addition of sodium carbonate. During the addition of the carbonate, an N-[4-(2,6-dinitropyrimidyl)]3,5-dinitrobenzamide hydrate product precipitated in the mixture as a crystalline solid. The product was separated by filtration and recrystallized from ethanol. The recrystallized product had carbon, hydrogen and nitrogen contents of 46.57, 3.83 and 21.0 percent, respectively, as compared to theoretical contents of 46.58, 3.91 and 20.91 percent. The product lost the solvent of crystallization upon heating and melted at 253.5°–254.0° C. and had carbon, hydrogen and nitrogen contents of 49.15, 3.50 and 22.18 percent, respectively, as compared to theoretical contents of 49.20, 3.50 and 22.10 percent.

In a similar manner other compounds of the present invention may be prepared as follows:

N-(3-pyrryl) 3,5-dinitrobenzamide by reacting 3,5-dinitrobenzoyl chloride with 3-aminopyrrole.

N-(3-furyl) 3,5-dinitrobenzamide by reacting 3,5-dinitrobenzoyl bromide with 3-aminofuran.

N-(2-methyl-3-furyl) 3,5-dinitrobenzamide by reacting 3,5-dinitrobenzoyl chloride with 3-amino-2-methylfuran.

N-(2-oxazolyl) 3,5-dinitrobenzamide by reacting 3,5-dinitrobenzoyl chloride with 2-aminooxazole.

N-(5-isooxazolyl) 3,5-dinitrobenzamide by reacting 3,5-dinitrobenzoyl bromide with 5-aminoisooxazole.

N-(3-methyl-4-isooxazolyl) 3,5-dinitrobenzamide by reacting 3,5-dinitrobenzoyl bromide with 4-amino-3-methylisooxazole.

N-(3-pyrryl) 3,5-dinitro-o-toluamide by reacting 3,5-dinitro-o-toluyl chloride with 3-aminopyrrole.

N-(2-thienyl) 3,5-dinitro-o-toluamide by reacting 3,5-dinitro-o-toluyl chloride with 2-aminothiophene.

N-(2-pyrazolyl) 3,5-dinitro-o-toluamide by reacting 3,5-dinitro-o-toluyl bromide with 2-aminopyrazole.

N-(3-pyrryl) 3,5-dinitro-2-methoxybenzamide by reacting 3,5-dinitro-2-methoxybenzoyl chloride with 3-aminopyrrole.

N-(3-pyridazyl) 3,5-dinitro-2-methoxybenzamide by reacting 3,5-dinitro-2-methoxybenzoyl chloride with 3-aminopyridazine.

N-(4-pyrimidyl) 3,5-dinitro-2-methoxybenzamide by reacting 3,5-dinitro-2-methoxybenzoyl chloride with 4-aminopyrimidine.

N-(3-furyl) 3,5-dinitro-2-ethylbenzamide by reacting 3,5-dinitro-2-ethylbenzoyl chloride with 3-aminofuran.

N-(2-pyridyl) 3,5-dinitro-2-ethylbenzamide by reacting 3,5-dinitro-2-ethylbenzoyl chloride with 2-aminopyridine.

N-(2-gammapicolyl) 3,5-dinitro-2-ethylbenzamide by reacting 3,5-dinitro-2-ethylbenzoyl chloride with 2-aminogammapicoline.

N-2-(4,6-lutidyl) 3,5-dinitro-2-ethylbenzamide by reacting 3,5-dinitro-2-ethylbenzoyl chloride with 2-amino-4,6-lutidine.

The compounds of the present invention have been found to be useful as parasiticides and as anthelmintics for the control of gastro-intestinal parasites in warm blooded animals. In such use, the unmodified compounds may be employed or compositions containing the compounds in admixture with an innocuous ingestible adjuvant or a finely divided solid such as alcohol, syrups, edible oils, chalk, bentonite grain rations, feed concentrates or supplements, or animal feeds. The products also may be employed as constituents of aqueous dispersions or oil-in-water emulsions with or without the addition of surface active dispersing agents. In representative operations, the feeding as a sole ration to chickens of a commercial poultry mash containing 0.1 percent by weight of N-(2-aminopyridyl) 3,5-dinitro-o-toluamide gave substantially complete controls of *Eimeria tenella* and cecal coccidiosis in the birds.

The 3,5-dinitrobenzoyl halides or 3,5-dinitro-2-alkylbenzoyl halides employed as starting materials in accordance with the teachings of the present invention may be prepared by reacting a suitable 3,5-dinitroarenoic acid with thionyl chloride ($SOCl_2$), thionylbromide or phosphorus pentachloride to produce the corresponding and desired acid halide. The 3,5-dinitro-2-methoxybenzoyl halide employed as starting material may be prepared by reacting an alkali metal methoxide with an alkali metal salt of 3,5-dinitro-2-chlorobenzoic acid whereby a methoxy group is substituted for chlorine to produce an alkali metal salt of 3,5-dinitro-2-methoxybenzoic acid. The salt is then converted to the corresponding acid and thereafter reacted with thionyl halide to produce the desired starting material.

We claim:

1. A dinitroaroylamide compound corresponding to the formula

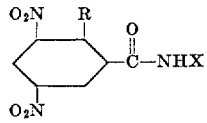

wherein R is a member of the group consisting of hydrogen, methyl, ethyl and methoxy and X is a member of the group consisting of pyridyl and methylpyridyl.

2. N-(2-pyridyl) 3,5-dinitro-o-toluamide.
3. N-(2-gammapicolinyl) 3,5-dinitro-o-toluamide.

References Cited in the file of this patent

UNITED STATES PATENTS 2,554,186    Goldberg et al. _____ May 22, 1951

FOREIGN PATENTS 519,555    Canada _____ Dec. 13, 1955
793,228    Great Britain _____ Apr. 9, 1958

OTHER REFERENCES

Katritzky: Jour. Chem. Soc., pp. 191–197 (1957).
Yale et al.: Jour. Am. Chem. Soc., vol. 75, pp. 1933–1942 (1953).
Elderfield: Heterocyclic Compounds, vol. 1, pages 412–3 (1950).
Sidgwick: "Organic Chemistry of Nitrogen," 2nd Ed., pages 166–7 (1937) (Oxford).